Oct. 16, 1962  A. HOHMANN  3,058,537
MOTION DETECTOR
Filed Nov. 29, 1961
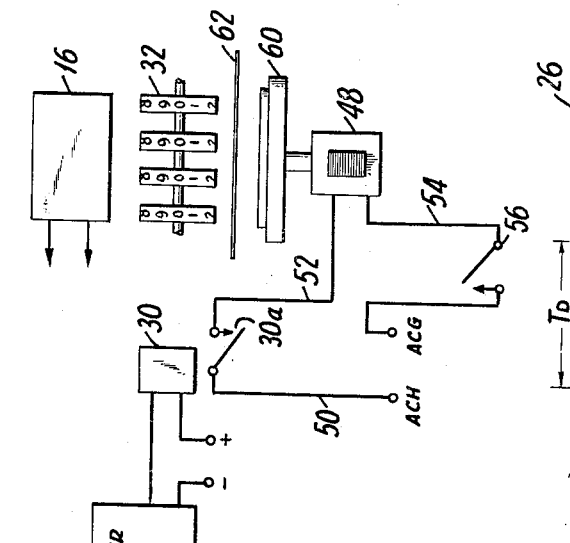
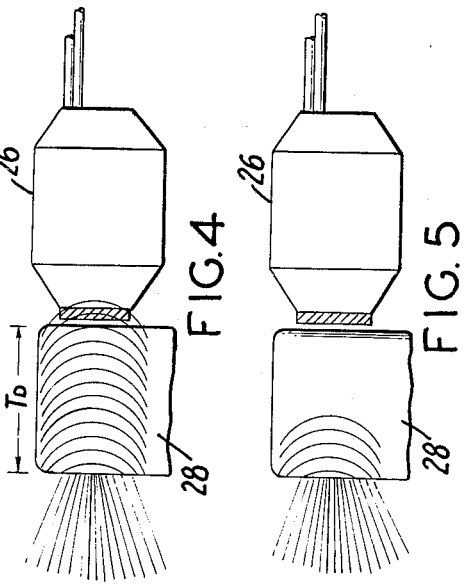
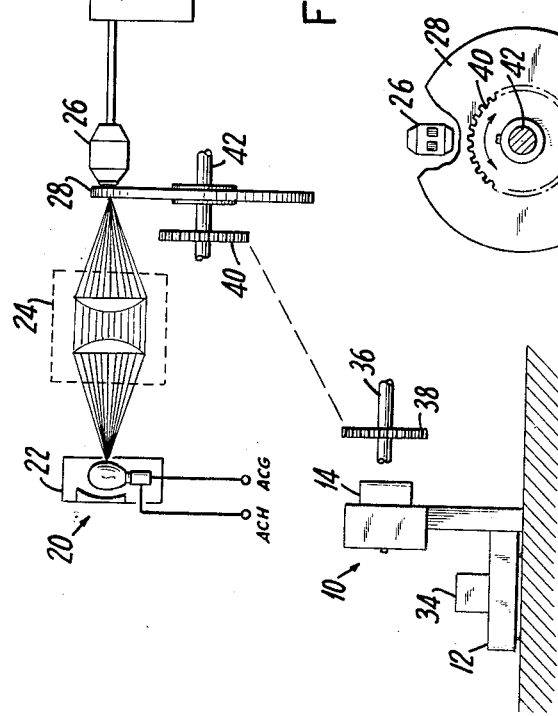
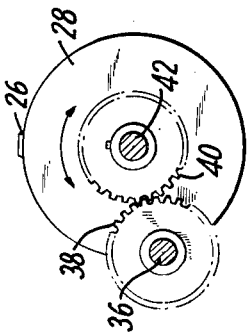
INVENTOR.
ALBERT HOHMANN
BY James H. Conner
AGENT.

United States Patent Office 3,058,537
Patented Oct. 16, 1962

3,058,537
MOTION DETECTOR
Albert Hohmann, Brooklyn, N.Y., assignor to American Electronics, Inc., Fullerton, Calif., a corporation of California
Filed Nov. 29, 1961, Ser. No. 155,672
6 Claims. (Cl. 177—12)

This invention relates generally to motion detection devices and in particular to a device for detecting movement of the balance in a weighing scale.

Heretofore in weighing systems having print readouts, the unbalance of a weighing scale required mechanical followers with time delays to inhibit printing while unbalance existed. It is readily apparent that printing readouts in a weighing scale system required means to ascertain the arrival of the scale at a static or balanced condition to avoid erroneous print-outs. Such a system is disclosed in Patent No. 2,856,176 entitled Scale Print Delay Device, issued October 14, 1958 to Cooper et al.

The utilization of follower devices such as disclosed in the above patent, introduced a tolerance or accuracy minimum that is not acceptable under certain weighing accuracy conditions. In heavy weighing systems wherein the weight to be determined is printed out to the nearest one hundred pounds or perhaps the nearest ten pounds, an error of two or three pounds falls within the acceptable minimum. However, where the weight of an object must be measured accurately within a few ounces, the aforementioned minimum is no longer acceptable. The prior mechanical follower devices introduced the two or three pound error by physically retarding the free movement of the balance. This contacting is a basic requirement and unavoidable condition of operating characteristics of a follower type in that the follower device moved under the direct control of the moving scale balance.

The present invention eliminates physical contact and the heretofore resultant basic error and further reduces load error to a minimum falling within the permissible scale accuracy to the nearest few ounces.

Accordingly, one of the principal objects of the invention resides in the provision of a motion detector having means to sense movement without a retarding physical contact with the moving member.

Still another object is to provide a free moving motion detector of the class described with inherent time delay means to delay printing or other readout operation until the moving scale balance member stops and is stationary for a predetermined minimum period of time.

Still another object is to provide a simple motion detector that is positive acting, simple to manufacture, and easily maintained.

Other ancillary objects will be, in part, hereinafter apparent and will be, in part, hereinafter pointed out.

In the drawing:

FIGURE 1 is a schematic diagram of the motion detector applied to a weighing system.

FIGURE 2 is a detail of the detector sensor with the rotary diffuser cut away to illustrate the position of the sensor.

FIGURE 3 is a detail of the drive gearing between the scale balance and the diffuser.

FIGURE 4 is an enlarged detail of the penetrating action of the radiating heat waves when the rotary diffuser is stationary.

FIGURE 5 is an enlarged detail of the radiating heat waves being diffused as the rotary diffuser rotates.

Referring to the drawing in detail, 10 generally designates a weighing scale having a platform 12, a weight indicating head 13, a balance, not shown, in the head 13 and a digitizing output 14 that remotely controls a printing counter 16. Scale 10 is conventional and well known to those skilled in the art. Briefly, the balance mechanism of the scale is actuated upon the placement of a load on the scale platform. The scale balance is unbalanced by the application of the load and the balance seeks a balanced condition. While the scale balance movement may be rotary or linear, the interval during which the balance is moving is critical and will produce erroneous readouts if printing is permitted to occur. It is only after the scale balance ceases to move or has come to rest that printing may be accomplished. Obviously, means must be provided to prevent printing during the over-balance or under-balance of the moving scale balance. Directed toward this end is a motion detector 20 comprising a heat source 22, an optical system 24, a heat sensitive element 26 and a rotary heat diffuser 28. Heat source 22 may be an infrared lamp or other conventional means of producing infrared ray heat. The output of source 22 is projected through the condensing lens optical system 24 to produce a concentrated beam that is focused upon a portion of the rotary diffuser 28.

Sensor 26 is disposed behind the portion of the diffuser 28 contacted by the beam in fixed relation. Said sensor is a conventional heat detecting type that generates minute voltages upon the sensing of infrared heat rays. Such a device is manufactured by Infrared Industries Inc., Waltham, Massachusetts, and is known as Lead Sulfide type B3–SA3. The minute voltages are amplified by conventional electronic amplifying means and then utilized to control the operation of a relay 30 included in a circuit hereinafter described.

Digitizer 14 is a conventional rotary type electrical readout device that converts rotary incremental scale movement into digital values. Conventional control means are provided, but not shown, that effectively actuates printing counter 16 to set up print wheels 32 to represent the digital value of the load 34 being weighed by scale 10. Such electrical readout systems are well known to those skilled in the art and need not be described herein. Briefly, digitizer 14 is in synchronous rotation with the scale balance. An output shaft 36, rotated by the digitizer 14, rotates concurrently with and under the influence of the scale balance, i.e.; shaft 36 is in motion during an unbalanced condition of scale 10. Affixed to shaft 36 and rotatable therewith is a gear 38 that is disposed in meshing engagement with a gear 40 affixed to a shaft 42. Shaft 42 is journalled in suitable bearings, not shown. Affixed to and rotatable with shaft 42 is the diffuser 28. Thus, motion of the scale balance produces similar motion in diffuser 28.

The friction produced by gears 38, 40 is constant and is compensated for by conventional adjustment means in scale 10. The sensitivity of scale 10 is therefore unaffected by the motion detector 20.

As shown in FIGURE 1, placement of load 34 on platform 12 of scale 10 initiates motion in the scale balance and shaft 36 rotates accordingly. Gears 38, 40, shaft 42, and diffuser 28 similarly rotate. It may be pointed out that diffuser 28 may be formed of any heat conducting material that absorbs the infrared rays produced by source 22.

While diffuser 28 is in motion, the heat rays absorbed are diffused and dissipated away from sensor 26. When the balance of scale 10 reaches a balanced condition, diffuser 28 becomes stationary and the heat rays concentrated upon the diffuser penetrate said diffuser and reach sensor 26, thus activating sensor 26 to generate minute voltages. The amplifier 27 utilizes the generated voltage to energize relay 30 which closes contacts 30a to preset a circuit for print solenoid 48. This circuit may be traced from a source of alternating current hot over conductor 50, through closed contacts 30a, over conductor 52 through the coil of solenoid 48 and over conductor 54 to one terminal of switch 56. The other terminal of switch 56 is connected by conductor 58 to the ground source of alternating current. Thus, closure of switch 56 energizes solenoid 48 to raise platen 60 and recording media 62 against the raised indicia on wheels 32 thereby taking a print of the digits represented by the engaged type.

Obviously, if relay 30 is not energized and contacts 30a are normally open, then closure of switch 56 does not complete the print solenoid circuit and a print cannot be made.

To insure against premature printing while the scale balance stops momentarily between an over-balance and under-balance, a time delay is provided. The time delay is inherent in the diffuser 28 and is a direct result of the relative thickness of diffuser 28. As shown in FIGURE 4, the heat rays have penetrated through diffuser 28 in sufficient quantity to energize sensor 26. The interval of time required for the heat rays to penetrate the thickness of diffuser 28, while stationary, is sufficient to prevent such through penetration during the moment that the diffuser rests between over and under balance. The diffuser 28 thus restricts for a minimum time delay period the required through penetration of the sensor-activating heat rays.

It will be noted that the freely rotatable members 36, 38, 40, 42, and 28 are not engaged by extraneous contact means and therefore do not impose or create undue friction that could impede or distort the normal operation of the scale balance. This freedom of rotation permits a more rapid arrival of the scale balance at the balanced condition and assures an accurate weighing operation.

While there has been shown but a single embodiment of the invention it will be understood that many modifications and changes could be made without departing from the scope of the invention, as set forth in the following claims.

The invention claimed is:

1. In a device for detecting the motion of a member, in combination, a heat source, means to concentrate heat emitted by said heat source on a predetermined portion of said member, heat detecting means disposed beyond said member in sensing relation to the predetermined portion of said member, and said member being adapted to dissipate the heat emitted by said heat source away from said heat detecting means while said member is in motion and to transmit heat through said member to the heat detecting means when said member is stationary and remains stationary for a minimum predetermined period of time.

2. In a device for detecting the motion of a member, in combination, a heat source, means to concentrate heat emitted by said heat source on a predetermined portion of said member, heat detecting means disposed beyond said member in sensing relation to the predetermined portion of said member, and said member being adapted to dissipate the heat emitted by said heat source away from said heat detecting means while said member is in motion and to transmit heat through said member to the heat detecting means when said member is stationary and remains stationary for a minimum predetermined period of time, and normally deactuated means actuatable upon the sensing of heat by said heat detecting means.

3. A device for detecting motion of a member comprising, in combination, a heat source, a heat detector, means to concentrate the heat emitted by said heat source on said heat detector, means disposed between said heat source and said heat detector synchronously movable with said member, and said synchronously movable means being adapted to absorb and dissipate heat away from said heat detecting means when said synchronously movable means is moving and to transmit heat to said heat detecting means when said synchronously movable means is stationary.

4. In a print delaying system for delaying a readout print of the weight of a load on a weighing scale while the scale balance seeks a balanced condition, in combination, motion detecting means, including a concentrated source of heat, a rotatable heat dissipating means, and heat sensing means, means to rotate said heat dissipating means in direct relation to the scale balance, means responsive to the sensing of movement of the heat dissipating means, including relay means energizable upon the sensing of heat by said heat sensing means, printing means, means to actuate said printing means, and means to prevent actuation of said printing means when said heat dissipating means dissipates the heat from said heat source away from said heat sensing means.

5. In a print delaying system for delaying a readout print of the weight of a load on a weighing scale while the scale balance seeks a balanced condition, in combination, motion detecting means, including a concentrated source of heat, a rotatable heat dissipating means, and heat sensing means, means to rotate said heat dissipating means in direct relation to the scale balance, means responsive to the sensing of movement of the heat dissipating means, including relay means energizable upon the sensing of heat by said heat sensing means, printing means, means to actuate said printing means, and means to prevent actuation of said printing means when said heat dissipating means dissipates the heat from said heat source away from said heat sensing means, and means controlled by said relay means to permit actuation of said printing means when said rotary heat dissipating means is stationary and the heat sensing means senses heat from said heat source penetrating through the stationary dissipating means.

6. In a print delaying system for delaying a readout print of the weight of a load on a weighing scale while the scale balance seeks a balanced condition, in combination, motion detecting means, including a concentrated source of heat, a rotatable heat dissipating means, and heat sensing means, means to rotate said heat dissipating means in direct relation to the scale balance, means responsive to the sensing of movement of the heat dissipating means, including relay means energizable upon the sensing of heat by said heat sensing means, printing means, means to actuate said printing means, and means to prevent actuation of said printing means when said heat dissipating means dissipates the heat from said heat source away from said heat sensing means, means controlled by said relay means to permit actuation of said printing means when said rotary heat dissipating means is stationary and the heat sensing means senses heat from said heat source penetrating through the stationary dissipating means, and said heat dissipating means having an inherent time delay based upon the period of time required for the heat from said heat source to penetrate said heat dissipating means when said rotary heat dissipating means is stationary and the penetrating heat is sensed by said sensing means.

No references cited.